United States Patent
Hoshino et al.

(10) Patent No.: US 8,273,820 B2
(45) Date of Patent: Sep. 25, 2012

(54) RUBBER COMPOSITION AND TIRE

(75) Inventors: Yuuta Hoshino, Kodaira (JP); Takako Miyazaki, Kodaira (JP); Kazunori Kaneda, Kodaira (JP)

(73) Assignee: Bridgestone Corpopration, Tokyo (JP)

( * ) Notice: Subject to any disclaimer, the term of this patent is extended or adjusted under 35 U.S.C. 154(b) by 0 days.

(21) Appl. No.: 12/863,335

(22) PCT Filed: Jan. 19, 2009

(86) PCT No.: PCT/JP2009/050612
§ 371 (c)(1),
(2), (4) Date: Jul. 16, 2010

(87) PCT Pub. No.: WO2009/091057
PCT Pub. Date: Jul. 23, 2009

(65) Prior Publication Data
US 2011/0054116 A1    Mar. 3, 2011

(30) Foreign Application Priority Data
Jan. 18, 2008  (JP) ................................. 2008-009419

(51) Int. Cl.
*C08K 3/40*    (2006.01)
*C08L 83/00*    (2006.01)
(52) U.S. Cl. ....................................... 524/494; 524/588
(58) Field of Classification Search ............ 524/494
See application file for complete search history.

(56) References Cited

U.S. PATENT DOCUMENTS

| | | | |
|---|---|---|---|
| 5,409,969 A | 4/1995 | Hamada | |
| 5,496,883 A | 3/1996 | Hamada | |
| 5,852,099 A * | 12/1998 | Vanel | 524/494 |
| 5,925,708 A | 7/1999 | Esch et al. | |
| 6,022,923 A | 2/2000 | Araki et al. | |
| 6,191,205 B1 * | 2/2001 | Micouin et al. | 524/492 |
| 2005/0004297 A1 | 1/2005 | Durel et al. | |
| 2005/0032965 A1 | 2/2005 | Valero | |
| 2007/0299203 A1 * | 12/2007 | Panz et al. | 524/588 |

FOREIGN PATENT DOCUMENTS

| | | |
|---|---|---|
| EP | 0 638 610 | 2/1995 |
| JP | 3-252431 | 11/1991 |
| JP | 06-157825 | 6/1994 |
| JP | 06-248116 | 9/1994 |
| JP | 7-070369 | 3/1995 |
| JP | 8-245838 | 9/1996 |
| JP | 10-182878 A | 7/1998 |
| JP | 11-124474 A | 5/1999 |
| JP | 2003-155383 A | 5/2003 |
| JP | 2005-500238 A | 1/2005 |
| JP | 2005-500420 A | 1/2005 |
| JP | 2006-037046 | 2/2006 |
| JP | 2007-138069 A | 6/2007 |

* cited by examiner

*Primary Examiner* — Hui Chin
(74) *Attorney, Agent, or Firm* — Sughrue Mion, PLLC

(57) ABSTRACT

Provided are a rubber composition which is improved in dispersion of silica into a rubber composition and improved in both of a low heat build-up and abrasion resistance and which is suitable as a tire tread member and a tire prepared by using the same.

In a rubber composition compounded with precipitated silica, a cetyltrimethylammonium bromide-adsorbing specific surface area (CTAB) ($m^2/g$) and the mode $A_{ac}$ (nm) in diameters of primary aggregates determined by acoustic measurement of particle size distribution satisfy equation (I) shown below:

$$A_{ac} \geq -0.76 \times (CTAB) + 274$$

and further an ignition loss (mass reduction % when heated at 750° C. for 3 hours) and a heating loss (mass reduction % when heated at 105° C. for 2 hours) satisfy equation (II) shown below:

(ignition loss)−(heating loss)≦3.

7 Claims, 1 Drawing Sheet

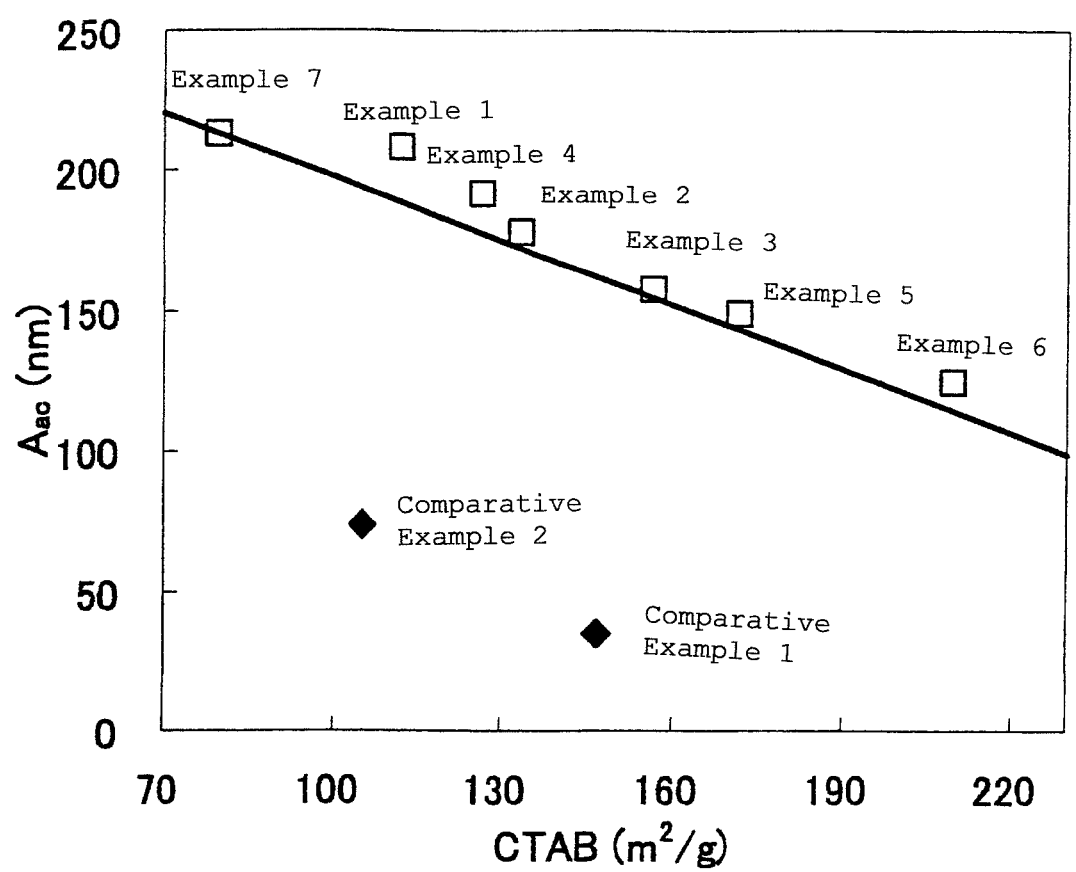

RUBBER COMPOSITION AND TIRE

CROSS REFERENCE TO RELATED APPLICATIONS

This application is a National Stage of International Application No. PCT/JP2009/050612 filed Jan. 19, 2009, claiming priority based on Japanese Patent Application No. 2008-009419, filed Jan. 18, 2008, the contents of all of which are incorporated herein by reference in their entirety.

TECHNICAL FIELD

The present invention relates to a rubber composition suitable as a tire tread member, more specifically to a rubber composition which is prepared by using precipitated silica having a specific structure as a reinforcing filler and which is improved in a low heat build-up and abrasion resistance and a tire prepared by using the same.

BACKGROUND ART

Carbon black has so far been used as a reinforcing filler for rubber. This is because carbon black can provide rubber compositions with high abrasion resistance. In recent years, as resource saving and energy saving are socially requested, a low heat build-up of tire rubber has come to be requested as well for the purpose of saving fuel consumption of cars. When a low heat build-up is to be achieved by using carbon black alone, it is considered that a compounding amount of carbon black is reduced or carbon black having a large particle diameter is used, but in both cases, it is known that reinforcement, abrasion resistance and grip on a wet road are not prevented from being reduced. On the other hand, it is known to use silica as a filler in order to enhance a low heat build-up (refer to, for example, patent documents 1 to 4). However, particles of silica tend to be aggregated by virtue of a hydrogen bond of a silanol group which is a surface functional group of silica, and a silanol group is inferior in wettability with rubber molecules due to a —OH group having hydrophilicity to deteriorate dispersion of silica into rubber. The kneading time has to be extended in order to improve the above problem. Also, a Mooney viscosity of a rubber composition is increased due to insufficient dispersion of silica into rubber, and a defect that the rubber composition is inferior in processability such as extrusion has been involved therein. Further, since a surface of a silica particle is acidic, silica adsorbs a basic substance used as a vulcanization accelerator in vulcanizing a rubber composition to prevent the rubber composition from being sufficiently vulcanized, so that the defect that the elastic modulus is not enhanced has been involved therein.

A silane coupling agent has been developed in order to improve the above defects, but dispersion of silica has not yet reached a sufficiently high level, and it has been particularly difficult to obtain industrially good dispersion of silica particles. Accordingly, it is tried to mix silica treated a surface thereof with a hydrophobicity-providing agent to accelerate reaction of a silane coupling agent (patent document 5).

Further, it is disclosed in patent document 6 to use hydrophobic precipitated silica. However, since precipitated silica subjected to complete hydrophobicity treatment is used, surface silanol groups to react with a silane coupling agent disappear, and therefore the defect that rubber is not sufficiently reinforced has been involved therein. Further, silica having an increased particle diameter is used in order to improve a low heat build-up, but in that case, the silica is reduced in a specific surface area by increasing a particle diameter to deteriorate a reinforcing property. It is disclosed in patent document 7 to use silica having a specific form, but a low heat build-up and abrasion resistance of a rubber composition are not sufficiently high.

Patent document 1: Japanese Patent Application Laid-Open Hei 6 No. 248116
Patent document 2: Japanese Patent Application Laid-Open Hei 7 No. 70369
Patent document 3: Japanese Patent Application Laid-Open Hei 8 No. 245838
Patent document 4: Japanese Patent Application Laid-Open Hei 3 No. 252431
Patent document 5: Japanese Patent Application Laid-Open Hei 6 No. 248116
Patent document 6: Japanese Patent Application Laid-Open Hei 6 No. 157825
Patent document 7: Japanese Patent Application Laid-Open No. 2006-37046

DISCLOSURE OF THE INVENTION

Problems to be Solved by the Invention

The present invention provides a rubber composition which is improved in dispersion of precipitated silica into a rubber composition and improved in both of a low heat build-up and abrasion resistance and which is suitable as a tire tread member and a tire prepared by using the same.

Means for Solving Problems

The present inventors have found that in a precipitated silica-containing rubber composition, a low heat build-up is obtained by providing precipitated silica with a specific structure and that at the same time, the rubber composition is improved in abrasion resistance and a reinforcing property, and thus the present invention has come to be completed.

The rubber composition of the present invention is a rubber composition which is prepared by compounding natural rubber and/or diene base synthetic rubber with structural precipitated silica, a silane coupling agent having a specific structure and carbon black and mixing them.

Precipitated silica used in the present invention is characterized by having a structure (primary aggregation) which can be shown by the following index.

That is, a cetyltrimethylammonium bromide-adsorbing specific surface area (CTAB) ($m^2/g$) and the mode $A_{ac}$ in diameters (nm) of primary aggregates determined by acoustic measurement of particle size distribution satisfy equation (I) shown below:

$$A_{ac} \geq -0.76 \times (CTAB) + 274 \tag{I}$$

and an ignition loss (mass reduction % when heated at 750° C. for 3 hours) and a heating loss (mass reduction % when heated at 105° C. for 2 hours) satisfy preferably equation (II) shown below:

$$(\text{ignition loss}) - (\text{heating loss}) \leq 3 \tag{II}$$

A rubber composition containing above precipitated silica can allow a low heat build-up to be consistent with abrasion resistance.

Precipitated silica used in the present invention is obtained by a method in which precipitated silica is deposited and precipitated by neutralizing an aqueous solution of an alkali salt of silicic acid such as sodium silicate with a mineral acid such as sulfuric acid and the like, a method according to a production method for so-called precipitated silica.

Effects of the Invention

According to the present invention, a rubber composition which is excellent in a low heat build-up is obtained, and when it is used as a tire tread member, the tire is excellent in both of a low heat build-up and abrasion resistance which are an antinomic matter and can contribute to energy saving to a large extent.

BRIEF EXPLANATION OF DRAWING

FIG. 1 is a graph showing relation between CTAB of precipitated silicas used in the examples and the comparative examples and $A_{ac}$.

MODE FOR CARRYING OUT THE INVENTION

The rubber component used for the rubber composition of the present invention is natural rubber and/or diene base synthetic rubber. The specific examples of the diene base synthetic rubber include synthetic polyisoprene rubber, polybutadiene rubber, styrene-butadiene rubber and the like. The above rubber components may be used alone or in a mixture of two or more kinds thereof.

Structural precipitated silica used in the present invention can be featured in that characteristic values thereof measured by a method usually used for measuring silica and carbon black satisfy the following relations.

That is, it is precipitated silica in which a cetyltrimethylammonium bromide-adsorbing specific surface area (CTAB) (m²/g) and a diameter $A_{ac}$ (nm) of the mode in the number of primary aggregates determined by an acoustic measurement of particle size distribution satisfy equation (I) shown below:

$$A_{ac} \geq 0.76 \times (CTAB) + 274 \quad (I)$$

and in which an ignition loss (mass reduction % when heated at 750° C. for 3 hours) and a heating loss (mass reduction % when heated at 105° C. for 2 hours) satisfy preferably equation (II) shown below:

$$(\text{ignition loss}) - (\text{heating loss}) \leq 3 \quad (II)$$

The cetyltrimethylammonium bromide-adsorbing specific surface area (CTAB) is a specific surface area (m²/g) of precipitated silica calculated from an adsorbing amount of cetyltrimethylammonium bromide onto a surface of precipitated silica.

CTAB can be measured according to a method described in ASTM D3765-92. The method described in ASTM D3765-92 is a method for measuring CTAB of carbon black, and therefore it shall be slightly modified. That is, a standard product of carbon black is not used, and a cetyltrimethylammonium bromide (hereinafter abbreviated as CE-TRAB) standard solution is prepared. This solution is used to standardize a precipitated silica OT (sodium di-2-ethylhexylsulfosuccinate) solution to calculate a specific surface area from an adsorbing amount of CE-TRAB assuming that an adsorbing cross-sectional area per one molecule of CE-TRAB onto a surface of precipitated silica is 0.35 nm².

Precipitated silica used in the present invention has CTAB of 50 to 250 m²/g, preferably 100 to 200 m²/g. If CTAB is less than 50 m²/g, the rubber composition is likely to be notably reduced in a storage modulus, and if it is larger than 250 m²/g, the unvulcanized rubber composition is likely to have an increased viscosity.

A diameter (acoustic particle size distribution diameter) measured as a particle diameter of precipitated silica by means of an acoustic measuring equipment of particle size distribution is an index for development of a constitutive property. The particles of precipitated silica contain particles prepared by primary aggregation of fine particles and slightly contain particles prepared by secondary aggregation of the above particles.

Measurement by the acoustic measuring equipment of particle size distribution is carried out after subjecting a 0.01M KCl aqueous solution of precipitated silica to dispersion treatment by an ultrasonic wave for 5 minutes to remove bubbles and to break secondary aggregates. Particle diameters of primary aggregates of precipitated silica and distribution of particle numbers thereof are obtained, and assuming that among them, a diameter of the particle observed in the highest frequency is set to $A_{ac}$ (nm), the rubber composition is improved in both of a low heat build-up and abrasion resistance when the following equation is satisfied.

$$A_{ac} \geq -0.76 \times (CTAB) + 274 \quad (I)$$

When $A_{ac}$ does not satisfy the above condition, the rubber composition is reduced in either or both of a low heat build-up and abrasion resistance. Further, $A_{ac}$ is preferably 1 μm or less. If it is larger than 1 μm, precipitated silica becomes a nucleus for breaking, and the kinetic properties of the rubber composition are likely to be damaged.

Further, a difference between a reduction (%) in a mass of precipitated silica used in the present invention when heating it and a reduction (%) in a mass thereof when igniting it is preferably:

$$(\text{ignition loss}) - (\text{heating loss}) \leq 3 \quad (II)$$

The heating loss and the ignition loss are measured according to a test method of compounding ingredients for rubber in JIS K6220-1, wherein the heating loss is a reduction (%) in the mass when heated usually at 105±2° C. for 2 hours, and the ignition loss is a reduction (%) in the mass when ignited usually at 750±25° C. for 3 hours.

A use amount of precipitated silica used in the present invention is preferably 10 to 150 parts by mass based on 100 parts by mass of the rubber component.

Precipitated silica used in the present invention is produced according to a production process for precipitated silica. For example, a reaction vessel filled in advance with a fixed amount of warm water is charged with sodium silicate and sulfuric acid while controlling pH and temperature to obtain a precipitated silica slurry after fixed time passes. Subsequently, the above precipitated silica slurry is separated by filtrating through a filtering device capable of washing a cake, such as a filter press and washed to remove by-produced electrolytes, and then a slurry is prepared from a precipitated silica cake obtained and dried by means of a dryer such as a spray dryer to thereby obtain precipitated silica.

In the present invention, a silane coupling agent is preferably used. The silane coupling agent is reacted with silanol groups remaining on a surface of precipitated silica and the rubber component polymer to act as a bonding bridge with the rubber and form a reinforcing phase.

The silane coupling agent used in the present invention is at least one selected from the group consisting of compounds represented by formulas shown below:

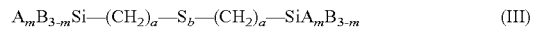

$$A_m B_{3-m} Si-(CH_2)_a-S_b-(CH_2)_a-SiA_m B_{3-m} \quad (III)$$

(wherein A is $C_n H_{2n+1} O$ (n is an integer of 1 to 3) or a chlorine atom; B is an alkyl group having 1 to 3 carbon atoms; m is an integer of 1 to 3; a is an integer of 1 to 9; b is an integer of 1 or more and may have distribution; provided that when m is 1, two B may be same or different and that when m is 2 or 3, two or three A may be same or different);

(wherein A is $C_nH_{2n+1}O$ (n is an integer of 1 to 3) or a chlorine atom; B is an alkyl group having 1 to 3 carbon atoms; Y is a mercapto group, a vinyl group, an amino group, a glycidoxy group or an epoxy group; m is an integer of 1 to 3; c is an integer of 0 to 9; provided that when m is 1, two B may be same or different and that when m is 2 or 3, two or three A may be same or different); and

(wherein A is $C_nH_{2n+1}O$ (n is an integer of 1 to 3) or a chlorine atom; B is an alkyl group having 1 to 3 carbon atoms; Z is a benzothiazolyl group, a N,N-dimethylthiocarbamoyl group or a methacryloyl group; m is an integer of 1 to 3; a is an integer of 1 to 9; b is an integer of 1 or more and may have distribution; provided that when m is 1, two B may be same or different and that when m is 2 or 3, two or three A may be same or different).

To be specific, the silane coupling agent represented by the formula (III) includes bis-(3-triethoxysilylpropyl) tetrasulfide, bis-(3-trimethoxysilylpropyl)tetrasulfide, bis-(3-methyldimethoxysilylpropyl)tetrasulfide, bis-(3-triethoxysilylethyl)tetrasulfide, bis-(3-triethoxysilylpropyl)disulfide, bis-(3-trimethoxysilylpropyl)disulfide and bis-(3-triethoxysilylpropyl)trisulfide;

the silane coupling agent represented by the formula (IV) includes 3-mercaptopropyltrimethoxysilane, 3-mercaptopropyltriethoxysilane, 3-mercaptopropylmethyldimethoxysilane, vinyltrimethoxysilane, vinyltriethoxysilane, 3-aminopropyltrimethoxysilane, 3-aminopropyltriethoxysilane, γ-glycidoxypropyltrimethoxysilane and γ-glycidoxypropylmethyldiethoxysilane; and the silane coupling agent represented by the formula (V) includes 3-trimethoxysilylpropyl-N,N-dimethylthiocarbamoyl tetrasulfide, 3-trimethoxysilylpropylbenzothiazolyl tetrasulfide and 3-trimethoxysilylpropylmethacryloyl monosulfide.

A use amount of the silane coupling agent is preferably 1 to 20% by mass based on an amount of precipitated silica. If the use amount is less than 1% by mass, the sufficiently high coupling effect is not obtained in a certain case, and if it exceeds 20% by mass, gelation of the polymer is brought about in a certain case.

In the rubber composition of the present invention, carbon black can be used as a reinforcing filler together with precipitated silica. Abrasion resistance of the rubber composition can be improved by compounding carbon black.

A use amount of carbon black is preferably 80 parts by mass or less based on 100 parts by mass of the rubber component, and a total compounding amount obtained by summing carbon black and precipitated silica is preferably 120 parts by mass or less. Controlling the total compounding amount to 120 parts by mass or less based on 100 parts by mass of the rubber component makes it possible to improve sufficiently the low heat build-up and the abrasion resistance.

The rubber composition of the present invention can suitably be compounded, if necessary, with compounding ingredients usually used in the rubber industry, for example, other reinforcing fillers, vulcanizing agents, vulcanization accelerators, antioxidants, softeners and the like.

The rubber composition of the present invention is obtained by kneading the components by means of an open type mixer such as a roll and an internal mixer such as a Banbury mixer, and it is vulcanized after subjected to molding processing and can be applied to various rubber products.

The tire of the present invention is characterized by applying the rubber composition described above to a tread member. The tire prepared by using the above rubber composition for a tread member has low rolling resistance since the rubber composition has a low heat build-up, and it is excellent in abrasion resistance. Ordinary air or air in which an oxygen partial pressure is changed or inert gas such as nitrogen can be used for gas charged into the tire of the present invention.

EXAMPLES

The present invention shall be explained below in further details with reference to examples and comparative examples, but the present invention shall by no means be restricted to the following examples.

In the following examples and comparative examples, the physical properties of precipitated silica and a low heat build-up and abrasion resistance of the rubber composition were measured and evaluated by the following methods.

Physical Properties of Precipitated Silica:

(1) Measurement of Acoustic Particle Size Distribution Diameter:

A 0.01M KCl aqueous solution of each precipitated silica was subjected to dispersion treatment for 5 minutes by an untrasonic wave to remove bubbles, and then the mode $A_{ac}$ (nm) in diameters of primary aggregates of precipitated silica was measured by means of an acoustic measuring equipment of particle size distribution DT1200 (manufactured by Dispersion Technology, Inc.).

(2) Measurement of CTAB:

CTAB was measured according to a method described in ASTM D3765-92. The method described in ASTM D3765-92 is a method for measuring CTAB of carbon black, and therefore it was slightly modified. That is, IRB #3 (83.0 m²/g) which was a standard product of carbon black was not used, and a cetyltrimethylammonium bromide (hereinafter abbreviated as CE-TRAB) standard solution was prepared separately. This solution was used to standardize a precipitated silica OT (sodium di-2-ethylhexylsulfosuccinate) solution to calculate a specific surface area (m²/g) from an adsorbing amount of CE-TRAB assuming that an adsorbing cross-sectional area per one molecule of CE-TRAB onto a surface of precipitated silica was 0.35 nm². This is because it is considered that carbon black and precipitated silica are different in a surface and therefore different in an adsorbing amount of CE-TRAB even if they have the same surface area.

(3) Measurement of Heating Loss and Ignition Loss:

A sample of precipitated silica was weighed and heated at 105±2° C. for 2 hours in the case of a heating loss and at 750±25° C. for 3 hours in the case of an ignition loss, and then the masses were measured to represent a difference from a mass of the sample before heated by % based on a mass thereof before heated.

(4) Low heat Build-Up:

The values of tan δ were measured at a temperature of 60° C., a distortion of 1% and a frequency of 50 Hz by means of a viscoelasticity spectrometer (manufactured by Toyo Seiki Seisakusho Ltd.). They were shown by an index, wherein the value in Comparative Example 1 was set to 100. The larger the above value is, the better the low heat build-up is.

(5) Abrasion Resistance:

The abrasion amount in a slip ratio of 60% at room temperature was measured by means of a Lambourn abrasion tester according to JIS K6264, and an inverse number of the abrasion amount was shown by an index, wherein the value in Comparative Example 1 was set to 100. The larger the above numerical value is, the better the abrasion resistance is.

Production of Precipitated Silica:

Production Example A

A jacketed stainless-made reaction vessel of volume 180 L equipped with a stirrer was charged with 93 L of water and 0.6 L of a sodium silicate aqueous solution ($SiO_2$ 160 g/L, $SiO_2$/$Na_2O$ mole ratio: 3.3) and heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 55 g/L. Subsequently, sulfuric acid having the concentration described above was added until pH of the solution was 3 to obtain a silica slurry. The silica slurry thus obtained was filtrated by means of a filter press, and the filtrated solid was washed with water to obtain a wet cake. Then, the wet cake was turned into a slurry by means of an emulsifying equipment, and the slurry was dried by means of a spray dryer to obtain precipitated silica A.

Production Example B

The same vessel as used in Production Example A was charged with 93 L of water and 0.6 L of the sodium silicate aqueous solution which were the same raw materials as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 30 minutes. A concentration of silica in the resulting solution was 55 g/L. Subsequently, sulfuric acid having the concentration described above was added until pH of the solution was 3 to obtain a silica slurry. Then, precipitated silica B was obtained by the same method as in Production Example A.

Production Example C

The same vessel as used in Production Example A was charged with 93 L of water and 0.6 L of the sodium silicate aqueous solution which were the same raw materials as used in Production Example A and heated up to 84° C. A concentration of $Na_2O$ in the resulting solution was 0.005 mol/L.

While maintaining the above solution at a temperature of 84° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 48 minutes, and the solution was gelatinized. Addition was further continued, and the reaction was terminated in 90 minutes. After terminating the reaction, a temperature of the reaction liquid was maintained at 84° C. for 30 minutes. A concentration of silica in the resulting solution was 55 g/L. Subsequently, sulfuric acid having the concentration described above was added until pH of the solution was 3 to obtain a silica slurry. Then, precipitated silica C was obtained by the same method as in Production Example A.

Production Example D

The same vessel as used in Production Example A was charged with 93 L of water and 0.6 L of the sodium silicate aqueous solution which were the same raw materials as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 60 minutes. A concentration of silica in the resulting solution was 55 g/L. Subsequently, sulfuric acid having the concentration described above was added until pH of the solution was 3 to obtain a silica slurry. Then, precipitated silica D was obtained by the same method as in Production Example A.

Production Example E

The same vessel as used in Production Example A was charged with 93 L of water and 0.6 L of the sodium silicate aqueous solution which were the same raw materials as used in Production Example A and heated up to 78° C. A concentration of $Na_2O$ in the resulting solution was 0.005 mol/L.

While maintaining the above solution at a temperature of 78° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 49 minutes, and the solution was gelatinized. Addition was further continued, and the reaction was terminated in 90 minutes. After terminating the reaction, a temperature of the reaction liquid was maintained at 78° C. for 60 minutes. A concentration of silica in the resulting solution was 55 g/L. Subsequently, sulfuric acid having the concentration described above was added until pH of the solution was 3 to obtain a silica slurry. Then, precipitated silica E was obtained by the same method as in Production Example A.

Production Example F

The same vessel as used in Production Example A was charged with 93 L of water and 0.6 L of the sodium silicate aqueous solution which were the same raw materials as used in Production Example A and heated up to 65° C. A concentration of $Na_2O$ in the resulting solution was 0.005 mol/L.

While maintaining the above solution at a temperature of 65° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 50 minutes, and the solution was gelatinized. Addition was further continued, and the reaction was terminated in 90 minutes. After terminating the reaction, a temperature of the reaction liquid was maintained at 65° C. for 60 minutes. A concentration of silica in the resulting solution was 55 g/L. Subsequently, sulfuric acid having the concentration described above was added until pH of the solution was 3 to obtain a silica slurry. Then, precipitated silica F was obtained by the same method as in Production Example A.

Production Example G

The same vessel as used in Production Example A was charged with 86 L of water and 0.5 L of the sodium silicate aqueous solution which were the same raw materials as used in Production Example A and heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 615 ml/minute and sulfuric acid (18 mol/L) at a flow rate of 27 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 40 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 62 g/L. Subsequently, sulfuric acid having the concentration described above was added until pH of the solution was 3 to obtain a silica slurry. Then, precipitated silica G was obtained by the same method as in Production Example A.

Examples 1 to 7 and Comparative Examples 1 to 2

Rubber compositions comprising rubber components and compounding ingredients of kinds and amounts each shown in Table 1 were prepared according to an ordinary method by using precipitated silica A to G produced respectively in Production Examples A to G in Examples 1 to 7, Nipsil AQ manufactured by Tosoh Silica Corporation in Comparative Example 1 and ULTRASIL VN2 manufactured by Degussa AG. in Comparative Example 2.

The physical properties of precipitated silica and vulcanized rubber used in the respective examples and comparative examples are shown in Table 2.

TABLE 1

| Blend composition | Parts by mass |
|---|---|
| SBR*[1] | 96.25 |
| BR*[2] | 30 |
| Carbon black*[3] | 15 |
| Precipitated silica*[4] | 65 |
| Organic silicon*[5] | 5.2 |
| Stearic acid | 2 |
| Antioxidant 6C*[6] | 1.5 |
| Zinc oxide | 3 |
| Vulcanization accelerator DGP*[7] | 0.5 |
| Vulcanization accelerator NS*[8] | 1 |
| Sulfur | 1.5 |

Remarks:
*[1]SBR # 120 (manufactured by JSR Corporation); subjected to oil extension by an aroma oil of 37.5 parts by mass based on 100 parts by mass of the rubber component
*[2]BR 150L (manufactured by Ube Industries, Ltd.)
*[3]Seast KH (N339) (manufactured by Tokai Carbon Co., Ltd.)
*[4]described in Production Examples A to G for precipitated silica
*[5]Silane coupling agent Si75 (manufactured by Degussa AG.)
*[6]N-(1,3-dimethylbutyl)-N'-phenyl-p-phenylenediamine
*[7]Diphenylguanidine
*[8]N-t-butyl-2-benzothiazylsulfeneamide

TABLE 2

| | Example | | | | | | | Comparative Example | |
|---|---|---|---|---|---|---|---|---|---|
| | 1 | 2 | 3 | 4 | 5 | 6 | 7 | 1 | 2 |
| Kind of precipitated silica | A | B | C | D | E | F | G | Nipsil AQ | ULTRASIL VN2 |
| CTAB ($m^2/g$) | 112 | 134 | 157 | 127 | 172 | 210 | 80 | 147 | 105 |
| Particle size distribution diameter $A_{ac}$ (nm) | 208 | 178 | 158 | 192 | 149 | 125 | 213 | 35 | 74 |
| −0.76 × CTAB + 274 | 189 | 172 | 155 | 177 | 143 | 114 | 212 | 162 | 194 |
| Ignition loss − heating loss (% by mass) | 2.6 | 2.6 | 2.1 | 2.2 | 2.9 | 2.9 | 2.8 | 2.3 | 3.3 |
| Low heat build-up (index) | 125 | 116 | 113 | 118 | 117 | 111 | 128 | 100 | 117 |
| Abrasion resistance (index) | 112 | 109 | 109 | 114 | 116 | 123 | 101 | 100 | 85 |

Relation between CTAB of precipitated silicas used in the examples and the comparative examples and the acoustic particle size distribution diameters $A_{ac}$ is shown by a graph in FIG. 1. It can be found that in precipitated silicas used in the examples, $A_{ac}$ is in an upper position than a straight line of $Y(A_{ac})=-0.76\times(CTAB)+274$ and satisfies equation (I) described above and that on the other hand, precipitated silica used in the comparative examples have smaller $A_{ac}$. Further, it can be found from the results shown in Table 2 that in precipitated silica used in the examples, a difference between the ignition loss and the heating loss satisfies as well equation (II) described above.

The rubber compositions in which a low heat build-up and abrasion resistance are well balanced and improved have been obtained by using the above precipitated silica.

The invention claimed is:

1. A rubber composition compounded with precipitated silica, wherein the rubber component is at least one rubber selected from the group consisting of natural rubber, synthetic polyisoprene rubber, polybutadiene rubber, and styrene-butadiene rubber and wherein in the precipitated silica, a cetyltrimethylammonium bromide-adsorbing specific surface area (CTAB) (m$^2$/g) and the mode $A_a$, (nm) in diameters of primary aggregates determined by an acoustic measurement of particle size distribution satisfy equation (I) shown below:

$$A_{ac} \geq -0.76 \times (CTAB) + 274 \qquad (I),$$

wherein the mode $A_{ac}$ is 1 μm or less, and an ignition loss (mass reduction % when heated at 750° C. for 3 hours) and a heating loss (mass reduction % when heated at 105° C. for 2 hours) satisfy equation (II) shown below:

$$(\text{ignition loss}) - (\text{heating loss}) \leq 3 \qquad (II).$$

2. The rubber composition as described in claim 1, wherein the precipitated silica has CTAB of 50 to 250 m$^2$/g.

3. The rubber composition as described in claim 1, wherein the precipitated silica is compounded in an amount of 10 to 150 parts by mass based on 100 parts by mass of the rubber component.

4. The rubber composition as described in claim 1, wherein a silane coupling agent is compounded in a proportion of 1 to 20% by mass based on a compounding amount of the precipitated silica.

5. The rubber composition as described in claim 4, wherein the silane coupling agent is at least one selected from the group consisting of:

a compound represented by formula (III) shown below:

$$A_m B_{3-m} Si\text{—}(CH_2)_a\text{—}S_b\text{—}(CH_2)_a\text{—}SiA_m B_{3-m} \qquad (III)$$

wherein A is $CH_{2n+1}O$ (n is an integer of 1 to 3) or a chlorine atom; B is an alkyl group having 1 to 3 carbon atoms; m is an integer of 1 to 3; a is an integer of 1 to 9; b is an integer of 1 or more and may have distribution; provided that when m is 1, two B may be same or different and that when m is 2 or 3, two or three A may be same or different;

a compound represented by formula (IV) shown below:

$$A_m B_{3-m} Si\text{—}(CH_2)_c\text{—}Y \qquad (IV)$$

wherein A is $CH_{2n+1}O$ (n is an integer of 1 to 3) or a chlorine atom; B is an alkyl group having 1 to 3 carbon atoms; Y is a mercapto group, a vinyl group, an amino group, a glycidoxy group or an epoxy group; m is an integer of 1 to 3; c is an integer of 0 to 9; provided that when m is 1, two B may be same or different and that when m is 2 or 3, two or three A may be same or different; and a compound represented by formula (V) shown below:

$$A_m B_{3-m} Si\text{—}(CH_2)_a\text{—}S_b\text{—}Z \qquad (V)$$

wherein A is $C_n H_{2n+1}O$ (n is an integer of 1 to 3) or a chlorine atom; B is an alkyl group having 1 to 3 carbon atoms; Z is a benzothiazolyl group, a N,N-dimethylthiocarbamoyl group or a methacryloyl group; m is an integer of 1 to 3; a is an integer of 1 to 9; b is an integer of 1 or more and may have distribution; provided that when m is 1, two B may be same or different and that when m is 2 or 3, two or three A may be same or different.

6. The rubber composition as described in claim 1, wherein carbon black is added as a reinforcing filler in an amount of 80 parts by mass or less based on 100 parts by mass of the rubber component, and a total compounding amount of carbon black and the precipitated silica is 120 parts by mass or less.

7. A tire prepared by applying the rubber composition as described in claim 1 to any of rubber members of the tire.

* * * * *